(12) United States Patent
Wakumoto et al.

(10) Patent No.: US 8,879,563 B2
(45) Date of Patent: Nov. 4, 2014

(54) CONTENT-BASED FORWARDING OF NETWORK TRAFFIC

(75) Inventors: Shaun Wakumoto, Roseville, CA (US); Mark Gooch, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 194 days.

(21) Appl. No.: 13/370,357

(22) Filed: Feb. 10, 2012

(65) Prior Publication Data
US 2013/0208725 A1 Aug. 15, 2013

(51) Int. Cl.
H04L 12/28 (2006.01)
H04L 12/725 (2013.01)
H04L 12/947 (2013.01)
H04L 12/743 (2013.01)

(52) U.S. Cl.
CPC .............. H04L 45/306 (2013.01); H04L 49/25 (2013.01); H04L 45/7453 (2013.01)
USPC ...................... 370/395.32; 370/401; 370/406

(58) Field of Classification Search
USPC ............... 370/401, 389, 392, 395.31, 395.32, 370/395.42, 393, 406
See application file for complete search history.

(56) References Cited

U.S. PATENT DOCUMENTS

| | | | |
|---|---|---|---|
| 7,587,487 B1 | 9/2009 | Gunturu | |
| 7,859,994 B2 * | 12/2010 | Sharma et al. | 370/218 |
| 7,957,399 B2 | 6/2011 | Nice et al. | |
| 2005/0086363 A1* | 4/2005 | Ji | 709/235 |
| 2006/0018321 A1 | 1/2006 | Yamada et al. | |
| 2011/0051602 A1 | 3/2011 | Matthews et al. | |
| 2013/0058255 A1* | 3/2013 | Casado et al. | 370/255 |
| 2013/0155902 A1* | 6/2013 | Feng et al. | 370/255 |

OTHER PUBLICATIONS

"Trajectory Sampling for Direct Traffic Observation"; N. G. Duffield; IEEE/ACM Transactions on Networking, vol. 9, No. 3, pp. 280-292; Jun. 2001.
"Traffic-Aware Routing Tree for Underwater 3-D Geographic Routing"; Zhang et al.; ISSNIP International Conference; Dec. 15-18, 2008; pp. 487-492.

* cited by examiner

*Primary Examiner* — Gary Mui

(57) ABSTRACT

A method includes reading content of network traffic that arrives at a network port of a network switch of a mesh of network switches. A hash algorithm is applied to the read content to indicate a path to a destination network switch of the mesh, the hash algorithm being common to all network switches of the mesh. The network traffic is forwarded via a network port that is associated with the indicated path.

15 Claims, 4 Drawing Sheets

CONTENT-BASED FORWARDING OF NETWORK TRAFFIC

BACKGROUND

Switch meshing technology enables interconnection of Ethernet network switches in a network. In accordance with switch meshing technology, network switches may be redundantly connected together. Various network stations or clients may be connected to various ports of the network switches of the network. Each network client and each port may be identified by a unique identifier.

During the course of network operation, a data packet may arrive at a switch. The data packet may be addressed to a destination network client on a designated port of a designated network switch. In accordance with switch meshing technology, redundant paths may be available (via intervening switches) for forwarding the data packet toward the destination switch. In this manner, a route may remain available when a link in one of the paths is broken, or in response to changing conditions of network traffic.

BRIEF DESCRIPTION OF THE DRAWINGS

Examples of content-based forwarding of network traffic may best be understood by reference to the following detailed description when read with the accompanied drawings in which.

DETAILED DESCRIPTION

Figure 1:
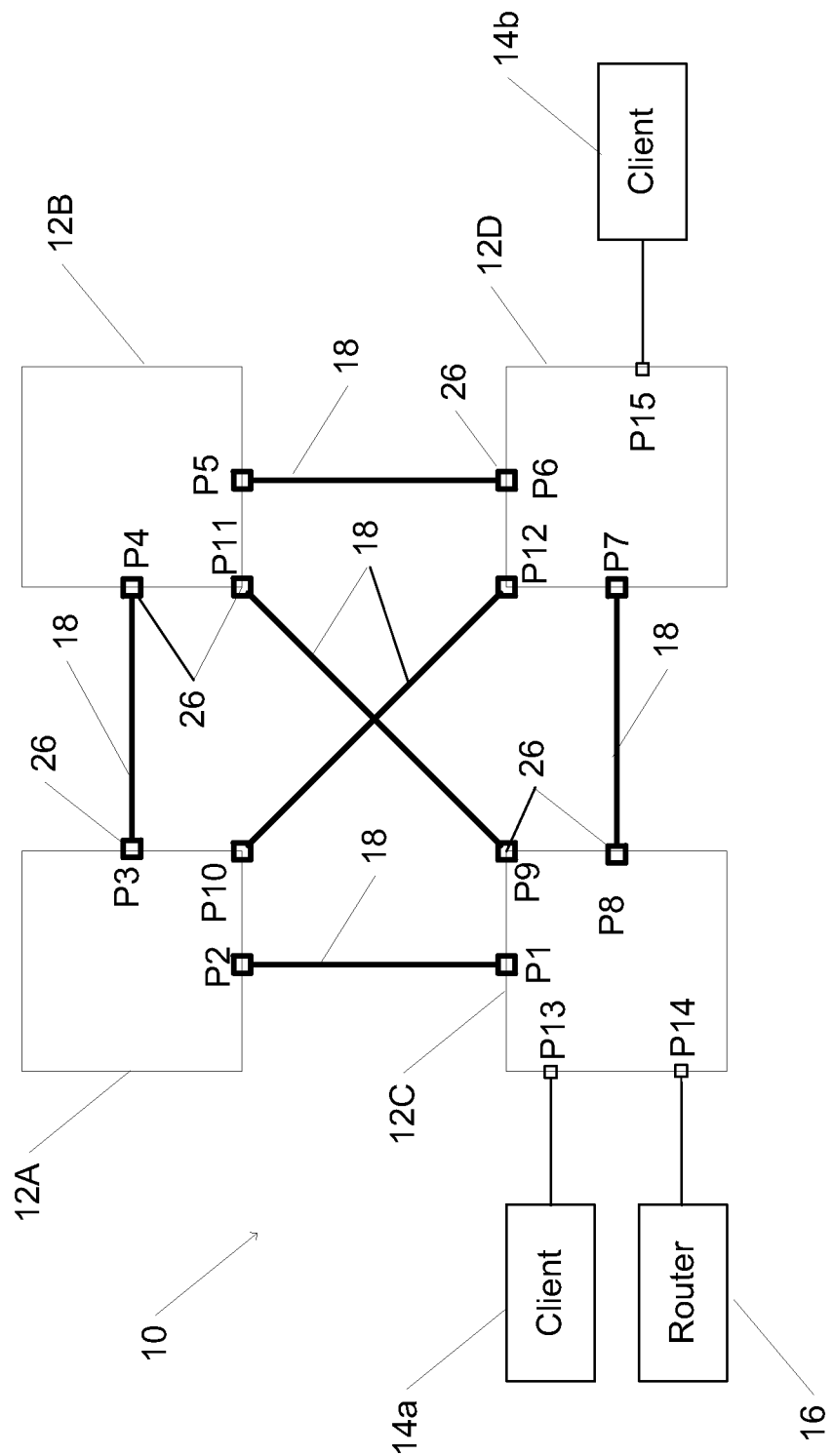
FIG. 1 is a schematic diagram of an example of a switch mesh for application of an example of content-based forwarding of network traffic.

In accordance with an example of content-based forwarding of unicast network traffic (network traffic addressed to a single destination), a network switch of a mesh of network switches may forward arriving network traffic based on analysis of content of the traffic. For example, each network switch (e.g. an Ethernet switch) in a switch mesh may be configured to apply a hash function to content of network traffic (e.g. a data packet) that arrives at that switch. The hash function is common to all of the network switches of the mesh (or to a subgroup of the network switches), and is applicable by any network switch of the mesh. Application of the hash function may then determine another network switch of the mesh to which the network traffic is to be forwarded. In this manner, the data traffic may be switched to a destination to which network traffic is addressed.

For example, a data packet may arrive at a network switch of the switch mesh via a network port of the network switch. A header or other content of the data packet may include information regarding an address of a destination, such as a client or router. For example, the destination address may be in the form of a Media Access Control (MAC) address of the destination in the case that the switch mesh is an Ethernet network. However, content-based forwarding of unicast network traffic as described herein is not limited to use in an Ethernet network, and may be equally well suited to other network types, e.g., asynchronous transfer mode (ATM) networks. The network may include a wireless network. The packet content may also include other information such as a source address (e.g. a MAC address of the source), a source or destination Internet Protocol (IP) address, a source or destination port address (e.g. in the form of a Transmission Control Protocol, or TCP, address, or a User Datagram Protocol, or UDP, address). The packet content may also include a physical ingress port on which the packet arrived, an IP protocol field, a priority, or a Differentiated Services Code Point field, Each network switch of the switch mesh may be associated with a plurality of indexed paths. Each of the indexed paths designates a possible route for transferring data from any network switch of the switch mesh to a destination network switch. The indexed paths may be defined by a path table that designates an order of network switches for each path. The path table may be updated from time to time, e.g. when a network switch is added to, or removed from, the switch mesh.

For example, the destination network switch may be connected directly to one or more other network switches of the mesh. Each of the other network switches of the switch mesh may, in turn, be similarly connected to other network switches of the switch mesh. An indexed path may thus designate a transfer of data directly from a source network switch to a destination network switch, or indirectly via other network switches in the switch mesh. Application of the hash function to a data packet specifying a destination (e.g. client or router) that is connected to a network port of the destination network switch may result in selection of one of the indexed paths that are associated with the destination network switch. Thus, each network switch that applies the hash function to a data packet that is arriving at that network switch forwards the packet through a network port that corresponds to the selected indexed path.

Such dynamic forwarding of network traffic in a switch mesh, by application by each network switch of a hash function to arriving traffic, may be advantageous. For example, such dynamic forwarding of network traffic may enable increased flexibility (e.g. enable a greater variety of paths) as compared with more static techniques of path selection (e.g. a technique wherein a single path to would be assigned each destination network switch for a predetermined period of time).

FIG. 1 is a schematic diagram of an example of a switch mesh for application of an example of content-based forwarding of network traffic.

Switch mesh 10 includes a plurality of network switches 12A through 12D. Network switches 12A through 12D may be interconnected via switch connections 18. Each of network switches 12A through 12D may include a plurality of network ports 26, each labeled network port P1 through P15. For example, network ports P1 through P12 are shown as serving to connect pairs of network switches 12A through 12D. Each of network ports P1 through P12 is shown as connecting one of network switches 12A through 12D with another of network switches 12A through 12D via a switch connection 18. A network machine or device (e.g. a computer, printer, scanner, server, workstation, wireless access point, wireless controller, network security device, network monitoring device or other peripheral device) may be connected to a network port of one of network switches 12A through 12D. For example, network port P13 of network switch 12C is connected to client 14*a*, network port P14 of network switch 12C is connected to router 16, and network port P15 of network switch 12D is connected to client 14*b*.

Thus, for example, client 14*b* on network switch 12D may send data (e.g. in the form of a data packet) to router 16 on network switch 12C either directly (from network port P7 of network switch 12D to network port P8 of network switch 12C), or via one or both of network switches 12A and 12B.

Each of network switches 12A through 12D may be operated in accordance with programmed instructions to receive network traffic through a network port 26, analyze data contents of the received network traffic, and forward the network traffic through another network port 26 in accordance with the results of analysis of the contents.

Figure 2:
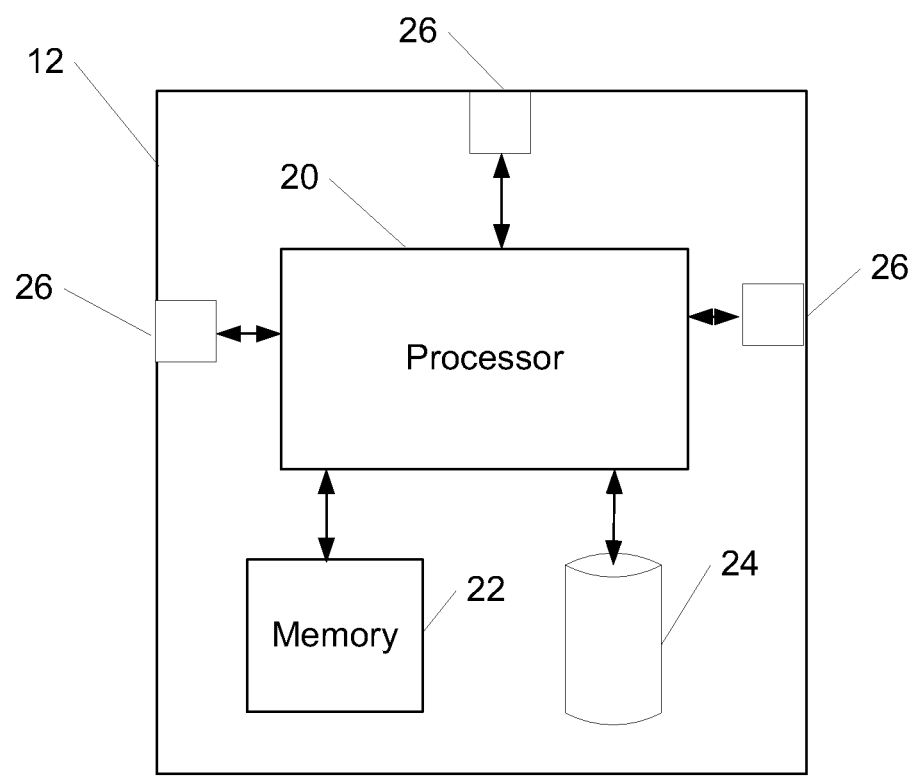
FIG. 2 is a schematic diagram of an example of a network switch for content-based forwarding of network traffic.

FIG. 2 is a schematic diagram of an example of a network switch for content-based forwarding of network traffic.

Network switch 12 includes a plurality of network ports 26. Network traffic may enter network switch 12 through any of network ports 26. Network traffic that enters network switch 12 via a network port 26 may be forwarded through another of network ports 26. For example, a network port 26 may be connected to another network switch via a switch connection 18 (FIG. 1), or to a networked device such as a client or router.

A selection of a network port 26 through which to forward network traffic may be made by processor 20. For example, processor 20 may include one or more of, or a combination of, processors, controllers, or circuitry that may be configured to analyze content of network traffic and forward the network traffic in accordance with a result of the analysis. Processor 20 may include an application-specific integrated circuit (ASIC). Processor 20 may operate in accordance with programmed instructions.

Processor 20 may communicate with a memory 22. Memory 22 may include one or more volatile or nonvolatile memory devices. For example, memory 22 may be utilized to store programmed instructions for operation of processor 20. Memory 22 may be utilized to store data and parameters used in operation of processor 20 and network switch 12. For example, memory 22 may be utilized to store a table or list of devices and network switches in switch mesh 10, and their associated properties. Memory 22 may also be utilized to store a hash function for use in analysis and forwarding of network traffic.

Processor 20 may communicate with a data storage device 24. Data storage device 24 may include one or more fixed or removable nonvolatile data storage devices or computer readable media. For example, data storage device 24 may be utilized to store programmed instructions for operation of processor 20. Data storage device 24 may be utilized to store data and parameters used in operation of processor 20 and network switch 12. For example, data storage device 24 may be utilized to store a table or list of devices and network switches in switch mesh 10 (FIG. 1), and their associated properties. Data storage device 24 may also be utilized to store a hash function for use in analysis and forwarding of network traffic.

For example, each network switch 12 of a switch mesh 10 may be provided with a table of devices in switch mesh 10. For example, such a table may include a MAC address of each device that is connected to a network switch 12 of switch mesh 10. For example, the table may indicate for each device with which network switch 12 that device is associated. In addition, each network switch 12 of switch mesh 10 may be provided with a table of paths with which every other destination network switch 12 of the switch mesh 10 is associated.

Figure 3:
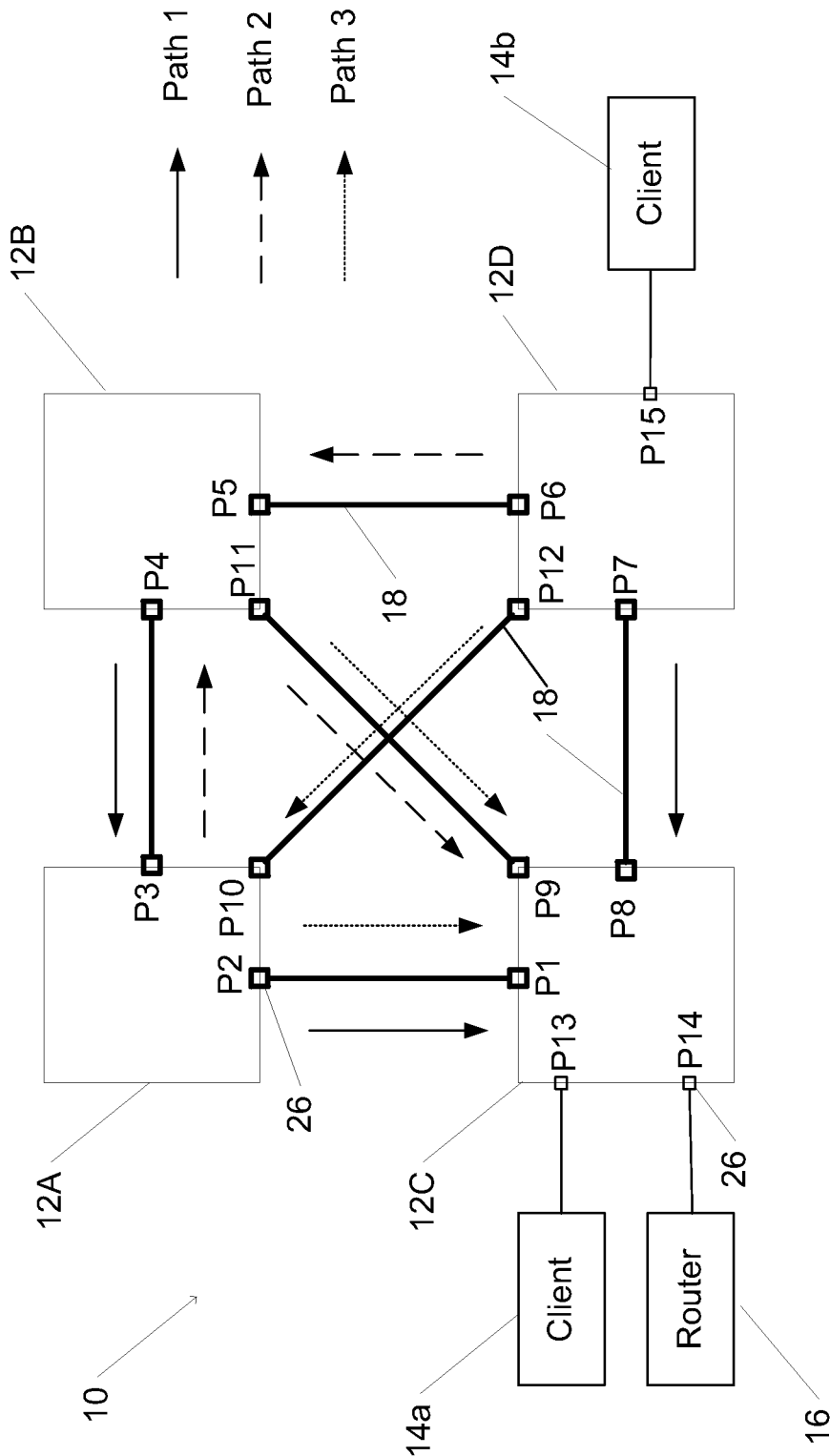
FIG. 3 illustrates an example of path selection in a switch mesh for content-based forwarding of network traffic.

FIG. 3 illustrates an example of path selection in a switch mesh for content-based forwarding of network traffic. As in FIG. 1, switch mesh 10 includes four network switches 12 labeled network switches 12A through 12D, with network ports 26 labeled network ports P1 through P15.

In the example shown, network switch 12C as a destination switch is associated with three network paths. Thus, network traffic may be switched to network switch 12C of switch mesh 10 from any of network switch 12A, network switch 12B, or network switch 12D along any of Path 1 (indicated by solid arrows), Path 2 (indicated by coarsely dashed arrows), or Path 3 (indicated by dotted arrows).

Selection of one of the paths may determine through which network port each of network switches 12A, 12B, and 12D forwards network traffic. Selection of one of the paths may also determine through which network port network switch 12C receives the forwarded network traffic.

For example, if Path 1 is selected for a data packet, network switch 12A may forward the data packet through port P2 to be received by network switch 12C through port P1. Alternatively, network switch 12B may forward the data packet through port P4, via ports P3 and P2 of network switch 12A, to be received by network switch 12C through port P1. Alternatively, network switch 12D may forward the data packet through port P7, to be received by network switch 12C through port P8.

If Path 2 is selected, network switch 12A may forward the data packet through port P3 (via ports P4 and P11 of network switch 12B), network switch 12B through port P11, and network switch 12D through port P6 (via ports P5 and P11 of network switch 12B), to be received by network switch 12C through port P9.

If Path 3 is selected, network switch 12A may forward the data packet through port P2, and network switch 12D through port P12 (via ports P10 and P2 of network switch 12A), to be received by network switch 12C through port P1. Alternatively, network switch 12B may forward the data packet through port P11, to be received by network switch 12C through port P9.

Thus, network traffic that is addressed to network switch 12C may be received by any of network switches 12A, 12B, or 12D. A processor of the network switch 12A, 12B, or 12D that received the network traffic may apply an example of a method for content-based forwarding to the network traffic. In accordance with the method, content of the network traffic may be read and a hash function or algorithm that is common to all of network switches 12A through 12D may be applied to the read content. Application of the common hash function may result in selection of a path. For example, if a destination of the network traffic is a device that is connected to network switch 12C, one of Path 1, Path 2, or Path 3 may be selected.

Figure 4:
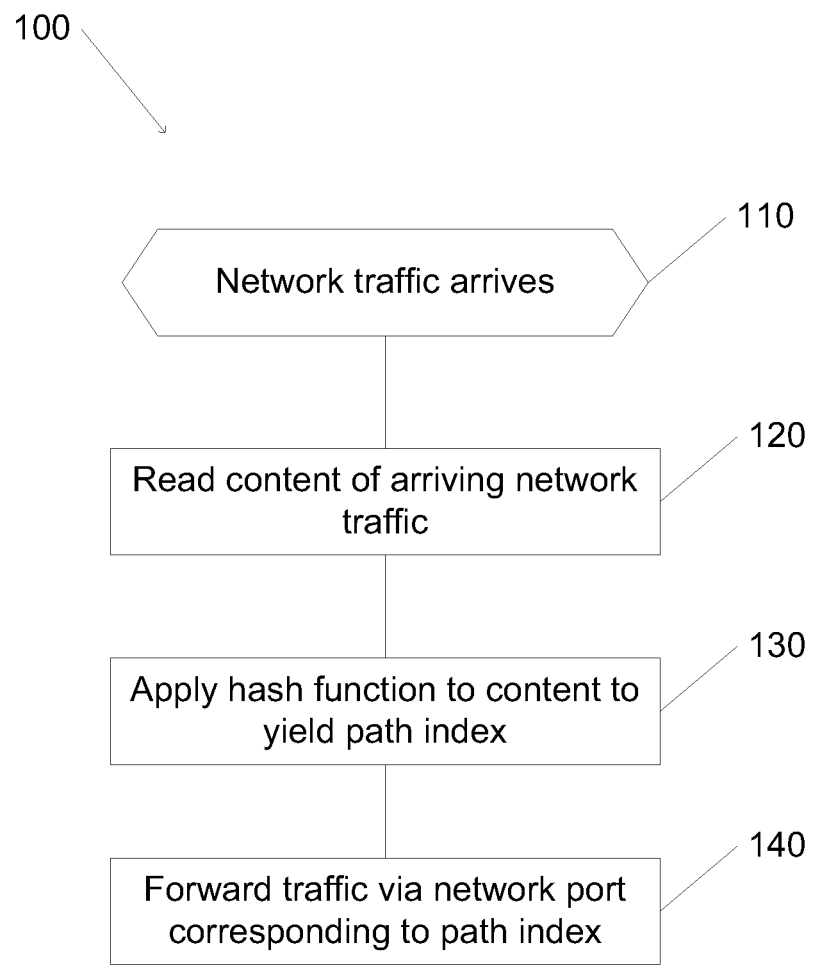
FIG. 4 is a flowchart of an example of a method of operating a network switch for content-based forwarding of network traffic.

FIG. 4 is a flowchart of an example of a method of operating a network switch for content-based forwarding of network traffic. Reference is also made to the example of a switch mesh shown in FIG. 3.

It should be understood with regard to the flowchart, that division of the illustrated method into operations represented by discrete blocks of the flowchart has been selected for convenience and clarity only. Alternative division of the illustrated method into discrete operations is possible, with equivalent results. Any such alternative division of the method into discrete operations should thus be considered to represent an additional example of a method of operating a network switch for content-based forwarding of network traffic.

Similarly, unless indicated otherwise, the illustrated order of execution of operations that are represented by blocks of the flowchart has been selected for convenience and clarity only. Execution of operations of the method in an alternative order or concurrently is possible with equivalent results. Such alternative ordering of execution of operations of the method should be considered to represent be an additional example of a method of operating a network switch for content-based forwarding of network traffic.

Switch operation method 100 may be executed, for example, by a processor of a network switch 12A through 12D.

Switch operation method 100 may be executed by a processor of a network switch 12A through 12D upon arrival of a network traffic to a network port 26 of a network switch 12A through 12D (block 110). For example, the arriving network traffic may be in the form of a data packet or Ethernet frame.

Content of the arriving network traffic may be read (block 120). For example, an arriving data packet may include a packet header. The packet header may include data content of data fields that are arranged in predetermined order. For example, a data field of a packet header may include information that defines a destination device (e.g. identified by a MAC address of the destination device or by an Internet Protocol (IP) address), a source device (e.g. identified by a MAC address of the source device or by an IP address), an EtherType (defining a protocol that is encapsulated in a packet payload), or source or destination TCP or UDP port, among other information.

A hash function may be applied to the read content of the arriving network traffic to yield an index of a path through the switch mesh (block 130).

A common identical hash function may have been previously distributed to all network switches 12A through 12D of switch mesh 10. For example, a hash function may be generated by a processor of one of network switches 12A through 12D, or by a processor of a device that is connected to switch mesh 10 (e.g. via network switches 12A through 12D or otherwise).

A hash function may be modified in accordance with current or projected traffic loads in switch mesh 10. For example, a distribution of network traffic among the paths may be monitored, and a hash function may be generated or modified at predetermined intervals to ensure adaptation to any changes in conditions. The hash function may be designed so as to balance a network traffic load among paths or network connections. A hash function may be generated or modified in response to predetermined events or conditions (e.g. traffic loads). When a hash function is generated or modified, the new hash function may be communicated to all network switches 12A through 12D of switch mesh 10.

The hash function that is applied to the contents of the arriving network traffic may select one of the paths that are associated with a destination of the network traffic. For example, the hash function may apply an exclusive or (XOR) operator to data that is included in fields of a header of an arriving data packet. The result of application of the hash function is an index to a path. Thus, application of the hash function may yield or return an index of one of those paths.

When the path is selected, the network switch may forward the network traffic via a port that corresponds to the selected path (block 140). For example, each of network switches 12A through 12D may be provided with a table that associates each path index with a port of that network switch. For example, a processor of the switch may create an outgoing data packet that contains the information of the data packet that had arrived.

When the forwarded network traffic arrives at another of network switches 12A through 12D, a processor of that network switch may also execute switch operation method 100 to further forward the network traffic. Switch operation method 100 may continue to be executed by successive network switches of the switch mesh until the network traffic arrives at its destination.

For example, consider an example of a data packet that is sent from client 14b and intended to be delivered to client 14a.

The packet may arrive at network port P15 of network switch 12D. A processor of network switch 12D may read contents of a header of the data packet and apply the hash function. For example, the header contents may indicate the source device as client 14b, the destination device as client 14a, and a destination TCP port 557 (or other packet content that may vary from packet to packet when connecting a source client with a destination client). Application of the hash function may yield an index 2, indicating that the selected path is Path 2 associated with destination network switch 12C. Thus, network switch 12D may forward the data packet via network port P6.

The data packet may then arrive at network port P5 of network switch 12B. Application by a processor of network switch 12B of the same hash algorithm as was previously applied by network switch 12D to contents of the packet may again indicate Path 2. Thus, network switch 12B may forward the packet via network port P11.

Thus, the data packet may arrive at port P9 of network switch 12C. Examination of the contents of the data packet may then indicate that destination client 14a is connected to network port P13. Thus, the data packet may be forwarded to client 14a via network port 14a.

Another data packet may be sent by client 14b to client 14a, but this time with a destination UDP port 3266 (or other different packet header content). In this case, application of the hash algorithm to content of the data packet may yield Path 1. Thus, network switch 12D may forward the packet via network port P7. The data packet may then arrive at network port P8 of network switch 12C. The data packet may then be forwarded to destination client 14a on network port P13.

As illustrated by the above examples, traffic representing two different flows between a single pair of clients may be sent through different paths in the mesh. In this manner, content-based forwarding of network traffic may result in improved utilization of the switch mesh and reliability of communication as compared with alternative methods of network traffic forwarding.

In accordance with an example of content-based forwarding of network traffic, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as an example of a method for content-based forwarding of network traffic.

The computer-readable medium may be a non-transitory computer-readable media including all forms and types of memory and all computer-readable media except for a transitory, propagating signal. In one implementation, external memory may be the non-volatile memory or computer-readable medium.

We claim:

1. A method comprising:
    reading a content of network traffic that arrives at a network port of a network switch of a mesh of network switches;
    applying a hash algorithm to the read content to indicate a path to a destination network switch of the mesh, the hash algorithm being common to all network switches of the mesh; and
    forwarding the network traffic via a network port that is associated with the indicated path.

2. The method of claim 1, wherein the network switch comprises an Ethernet switch.

3. The method of claim 1, wherein reading the content comprises reading a header of a data packet.

4. The method of claim 1, wherein the read content includes a content selected from a group of network traffic contents consisting of: a source device, a destination device, a physical ingress port on which the network traffic arrived, a source MAC address, a destination MAC address, a source IP address, a destination IP address, an IP protocol field, a TCP source port, a UDP source port, a TCP destination port, a UDP destination port, a priority, a Differentiated Services Code Point, and an EtherType.

5. A non-transitory computer readable medium having stored thereon instructions that when executed by a processor will cause the processor to perform the method of:
   applying a hash algorithm to content of network traffic that arrives at a network port of a network switch of a mesh of network switches, application of the hash algorithm indicating a path to a destination network switch of the mesh; and
   forwarding the network traffic via a network port that is associated with the indicated path.

6. The non-transitory computer readable medium of claim 5, wherein the network switch comprises an Ethernet switch.

7. The non-transitory computer readable medium of claim 5, comprising reading the content from the network traffic that arrives at the network port.

8. The non-transitory computer readable medium of claim 7, wherein reading the content comprises reading a header of a data packet.

9. The non-transitory computer readable medium of claim 5, wherein the content includes a content of a type selected from a group of network traffic content types consisting of: a source device, a destination device, a destination port, and an EtherType.

10. A network switch device comprising:
    a plurality of network ports;
    a processing unit in communication with a computer readable medium, wherein the computer readable medium contains a set of instructions executable by the processing unit to:
       read a content of network traffic that arrives at a network port of said plurality of network ports;
       apply a hash algorithm to the read content; and
       forward the network traffic via a network port of said plurality of network ports.

11. The device of claim 10, wherein the device comprises an Ethernet switch.

12. The device of claim 10, wherein a network port of said plurality of network ports is connectable to a mesh of network switch devices.

13. The device of claim 12, wherein the hash function, being common to all network switches of the mesh, is applicable by any of the network switch devices of the mesh.

14. The device of claim 10, wherein the network traffic comprises a data packet.

15. The device of claim 10, wherein the read content includes a content of a type selected from a group of network traffic content types consisting of: a source device, a destination device, a physical ingress port on which the network traffic arrived, a source MAC address, a destination MAC address, a source IP address, a destination IP address, an IP protocol field, a TCP source port, a UDP source port, a TCP destination port, a UDP destination port, a priority, a Differentiated Services Code Point, and an EtherType.

* * * * *